(12) United States Patent
Okada et al.

(10) Patent No.: US 9,399,483 B2
(45) Date of Patent: Jul. 26, 2016

(54) STEERING-BRACKET SUPPORTING APPARATUS AND STEERING APPARATUS

(71) Applicant: NSK LTD., Tokyo (JP)

(72) Inventors: Shinji Okada, Gunma (JP); Yuuichi Tomaru, Gunma (JP)

(73) Assignee: NSK LTD., Tokyo (JP)

( * ) Notice: Subject to any disclaimer, the term of this patent is extended or adjusted under 35 U.S.C. 154(b) by 103 days.

(21) Appl. No.: 14/767,313

(22) PCT Filed: Nov. 17, 2014

(86) PCT No.: PCT/JP2014/080389
§ 371 (c)(1),
(2) Date: Aug. 12, 2015

(87) PCT Pub. No.: WO2015/076225
PCT Pub. Date: May 28, 2015

(65) Prior Publication Data
US 2015/0375774 A1      Dec. 31, 2015

(30) Foreign Application Priority Data

Nov. 20, 2013  (JP) .................................. 2013-240259
Nov. 20, 2013  (JP) .................................. 2013-240260

(51) Int. Cl.
*F16M 13/00*      (2006.01)
*B62D 1/19*       (2006.01)

(52) U.S. Cl.
CPC ..................................... *B62D 1/195* (2013.01)

(58) Field of Classification Search
CPC combination set(s) only.
See application file for complete search history.

(56) References Cited

U.S. PATENT DOCUMENTS

| 4,086,825 | A | * | 5/1978 | Badcock | B62D 1/192 280/777 |
| 5,820,163 | A | * | 10/1998 | Thacker | B62D 1/184 280/775 |
| 5,899,116 | A | * | 5/1999 | Armstrong | B62D 1/195 188/376 |
| 8,702,126 | B2 | * | 4/2014 | Gloden et al. | B62D 1/195 280/777 |
| 8,967,017 | B2 | * | 3/2015 | Osawa et al. | B62D 1/184 280/775 |
| 2003/0000330 | A1 | * | 1/2003 | Murakami | B62D 1/189 74/492 |

(Continued)

FOREIGN PATENT DOCUMENTS

JP      51-115319 U     8/1975
JP      63-19467 U      2/1988

(Continued)

OTHER PUBLICATIONS

International Search Report of PCT/JP2014/080389, dated Feb. 10, 2015. [PCT/ISA/210].

*Primary Examiner* — Monica Millner
(74) *Attorney, Agent, or Firm* — Sughrue Mion, PLLC

(57) ABSTRACT

A supporting apparatus for a steering bracket includes, a steering bracket supporting a steering column and including a first capsule-side hole and a second capsule-side hole, a separation capsule including a first bracket-side hole and a second bracket-side hole, a resin member straddling the first bracket-side hole and the first capsule-side hole, a shear pin straddling the second bracket-side hole and the second capsule-side hole, and a cam mechanism including a rotatable weight portion to pull out the shear pin from the second bracket-side hole, the weight portion constituted to rotate around the shear pin by inertia due to a primary collision and to move to a front of a vehicle, and the cam mechanism constituted to pull out the shear pin from the bracket-side hole by a rotation of the weight portion.

5 Claims, 13 Drawing Sheets

(56) References Cited

U.S. PATENT DOCUMENTS

| | | | |
|---|---|---|---|
| 2004/0232685 A1* | 11/2004 | Gatti | F16F 7/123 280/777 |
| 2006/0214411 A1* | 9/2006 | Ikegaya | B62D 1/19 280/777 |
| 2006/0273568 A1* | 12/2006 | Manwaring | B62D 1/195 280/777 |
| 2007/0228717 A1 | 10/2007 | Tanai | |
| 2008/0229867 A1* | 9/2008 | Waibel | B62D 1/195 74/493 |
| 2008/0238070 A1* | 10/2008 | Bodtker | B62D 1/195 280/777 |
| 2008/0257097 A1* | 10/2008 | Graf | B62D 1/184 74/493 |
| 2010/0282016 A1* | 11/2010 | Oehri | B62D 1/195 74/493 |
| 2012/0024101 A1* | 2/2012 | Schnitzer | B62D 1/195 74/492 |
| 2012/0080874 A1* | 4/2012 | Narita | B62D 1/184 280/777 |
| 2012/0291585 A1* | 11/2012 | Minamigata et al. | B62D 1/195 74/493 |
| 2013/0160592 A1* | 6/2013 | Shibazaki et al. | B62D 1/16 74/492 |
| 2013/0255430 A1* | 10/2013 | Moriyama; Seiichi | B62D 1/184 74/493 |

FOREIGN PATENT DOCUMENTS

| | | |
|---|---|---|
| JP | 7-81586 A | 3/1995 |
| JP | 2006-219014 A | 8/2006 |
| JP | 2007-76613 A | 3/2007 |
| JP | 2007-269190 A | 10/2007 |

* cited by examiner

STEERING-BRACKET SUPPORTING APPARATUS AND STEERING APPARATUS

CROSS REFERENCE TO RELATED APPLICATIONS

This application is a National Stage of International Application No. PCT/JP2014/080389 filed Nov. 17, 2014, claiming priority based on Japanese Patent Application Nos. 2013-240259, filed Nov. 20, 2013 and 2013-240260, filed Nov. 20, 2013, the contents of all of which are incorporated herein by reference in their entirety.

BACKGROUND OF THE INVENTION

1. Field of the Invention

The present invention relates to a steering-bracket supporting apparatus, i.e. a supporting apparatus for fixing a steering bracket to a vehicle body and also relates to a steering apparatus.

2. Description of the Related Art

Prior Art 1 and 2 disclose techniques of a separation capsule in which when an excessive load is applied to a steering column attached to a vehicle and the steering column is pushed to the front of the vehicle, a part of the supporting structure is separated and the steering column thus moves to the front of the vehicle, thereby protecting a driver (operator) from a thrust (secondary collision) of a steering wheel.

PRIOR ART

Prior Art 1: JP 63-019467 U1
Prior Art 2: JP 07-081586 A

In the techniques disclosed in the Prior Art 1 and 2, since a set value of the separation load at which the steering column moves to the front of the vehicle is lowered by cutting a part of the supporting structure, there is a possibility of occurrence in malfunction, in a case of trying to protect an operator who is light in weight.

The present invention has been made in view of the above problem. An object of the present invention is to provide a steering-bracket supporting apparatus and a steering apparatus which are capable of suppressing the malfunction in an ordinary use even when a part of the supporting structure is separated and thus the set value of the separation load at which the steering column moves to the front of the vehicle.

SUMMARY OF THE INVENTION

It is an object of the present invention to at least partially solve the problems in the conventional technology. According to an aspect of the invention, a supporting apparatus for a steering bracket includes, a steering bracket supporting a steering column, the steering bracket including a first capsule-side hole and a second capsule-side hole opened thereon; a separation capsule to fix a vehicle body-side member to the steering bracket, the separation capsule including a first bracket-side hole and a second bracket-side hole opened thereon; a resin member arranged at a position straddling the first bracket-side hole and the first capsule-side hole in a state before separation; a shear pin arranged at a position straddling the second bracket-side hole and the second capsule-side hole in a state before separation; and a cam mechanism including a rotatable weight portion to pull out the shear pin from the second bracket-side hole, the weight portion constituted to rotate around the shear pin by inertia due to a primary collision and to move to a front of a vehicle, and the cam mechanism constituted to pull out the shear pin from the bracket-side hole by a rotation of the weight portion.

When a load is applied to the steering column, which is attached to the vehicle, by the impact in the ordinary use, the steering column is pushed to the front of the vehicle and the resin member is subjected to the shearing force, and the shearing force is similarly applied to the shear pin. Thus, the fracture of the resin member is suppressed and the malfunction is suppressed during the ordinary use. Meanwhile, in the case of the collision (primary collision) of the vehicle, the shear pin is pulled out by a cam mechanism so that a part of the supporting structure is cut and the set value of the separation load at which the steering column moves to the front of the vehicle is lowered, thereby the supporting apparatus for the steering bracket can alleviate the impact of an operator who is light in weight.

As a desirable aspect of the invention, the cam mechanism includes a cam rotor interlocking with the shear pin and a cam stator fixed to the steering bracket or the separation capsule, the cam rotor is constituted to rotate relative to the cam stator and to change an insertion length of the shear pin into the second bracket-side hole depending on the rotation amount of the cam rotor. Thus, the cam mechanism can convert a rotating motion to a motion in which the shear pin is pulled out from the second bracket-side hole, depending on the amount of rotation due to the action of inertia.

As a desirable aspect of the invention, the cam rotor includes a lever member to move a center of gravity outward from a rotation center of the cam rotor. Thus, it is possible to set a set value of an operation load in which the cam mechanism operates.

As a desirable aspect of the invention, the weight portion is located at a side far from the cam rotor of the lever member. This makes it possible to increase the amount of movement of the center of gravity toward the outside rather than the rotation center of the cam rotor.

As a desirable aspect of the invention, a steering apparatus is supported by the supporting apparatus for the steering bracket as described above. Thus, a part of the supporting structure is cut and thus the set value of the separation load at which the steering column moves to the front of the vehicle is lowered, so that the steering apparatus can further protect the operator who is light in weight.

According to the present invention, it is possible to provide a steering-bracket supporting apparatus and a steering apparatus which can suppress the malfunction in an ordinary use even when a part of the supporting structure is cut and thus the set value of the separation load at which a steering column moves to the front of the vehicle is lowered.

DETAILED DESCRIPTION OF THE PREFERRED EMBODIMENT

Embodiments of the present invention will be described in detail with reference to the drawings. The present invention is not limited by the contents described in the following embodiments. In addition, elements described below include those that are easily conceived by a person skilled in the art and that are substantially the same. Further, the elements described below can be properly combined.

First Embodiment

Figure 1:
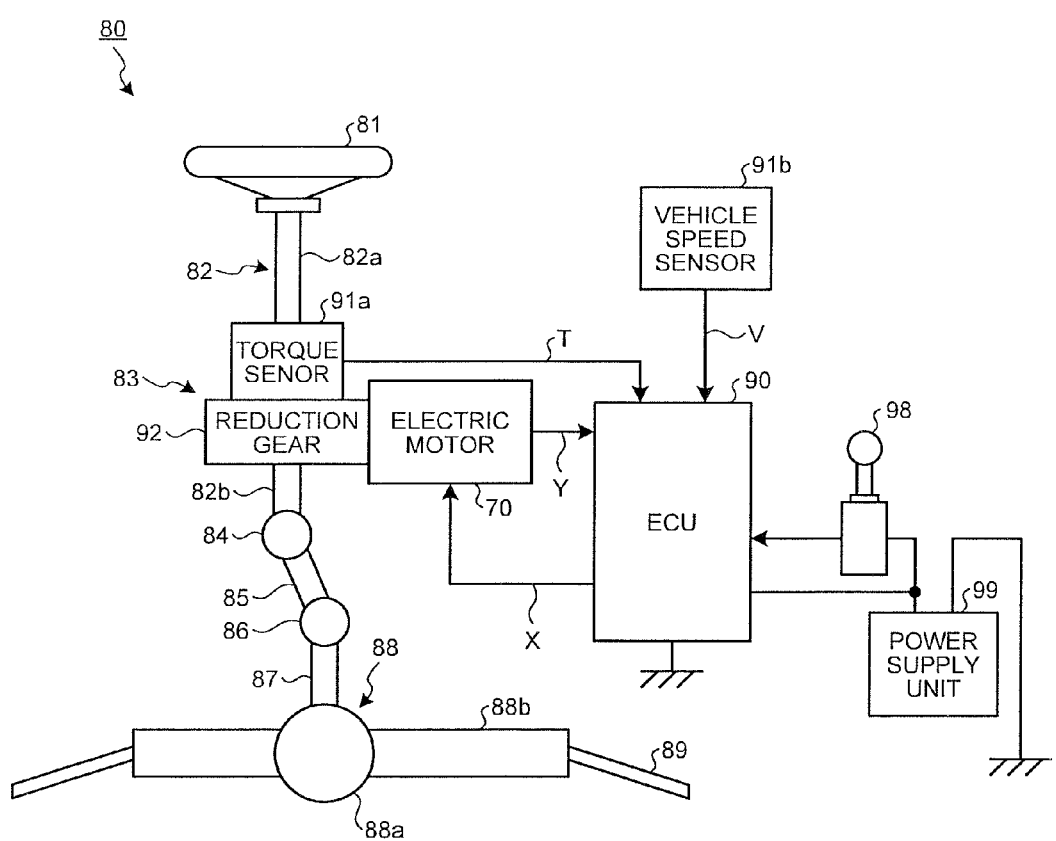
FIG. 1 is a constitution diagram of an electric power steering apparatus provided with an electric motor according to a first embodiment.
Figure 2:
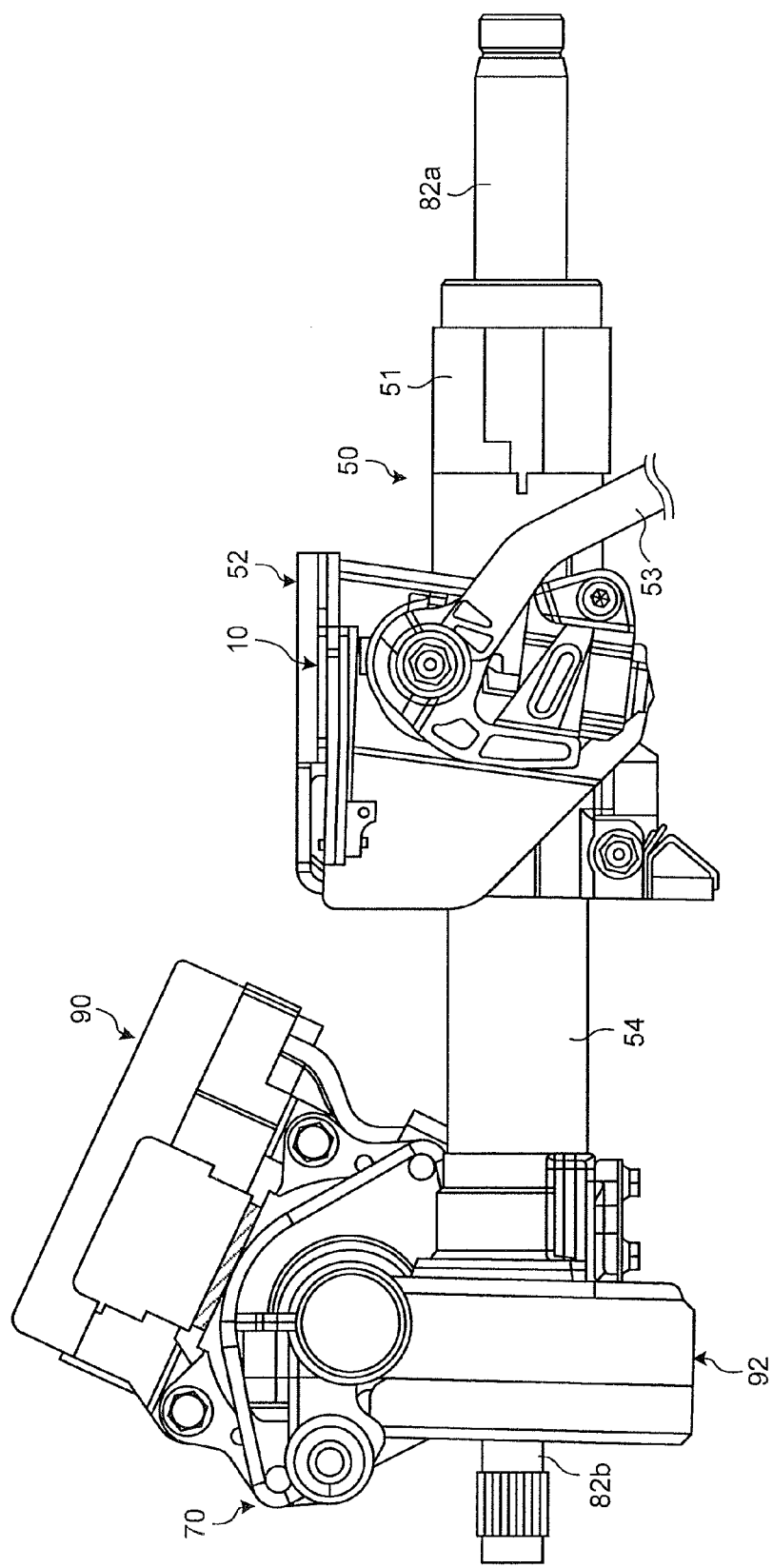
FIG. 2 is a side view schematically illustrating a periphery of a steering column.
Figure 3:
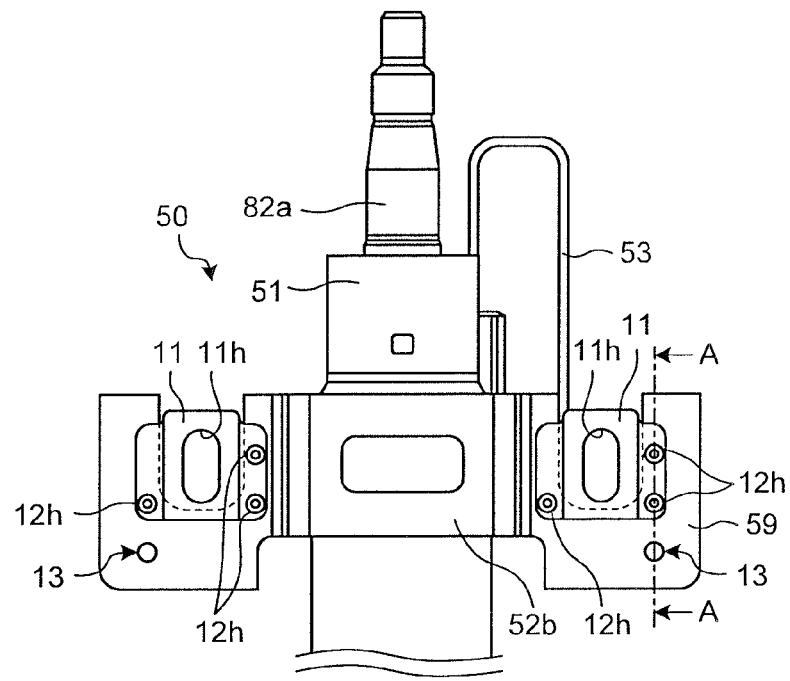
FIG. 3 is a plan view schematically illustrating a supporting apparatus for a steering bracket that is used to attach a steering column to a vehicle.
Figure 4:
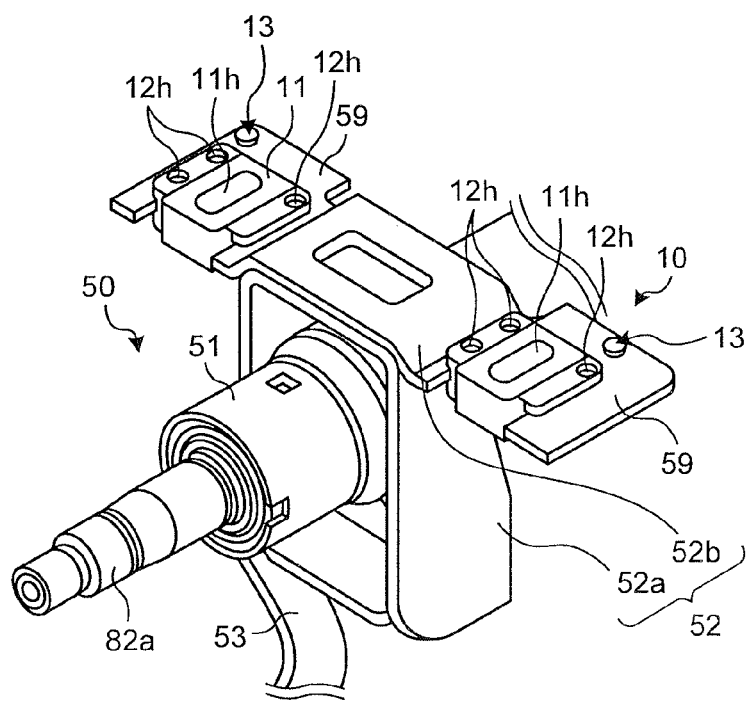
FIG. 4 is a perspective view schematically illustrating a portion in which the steering column is attached to the vehicle.
Figure 5:
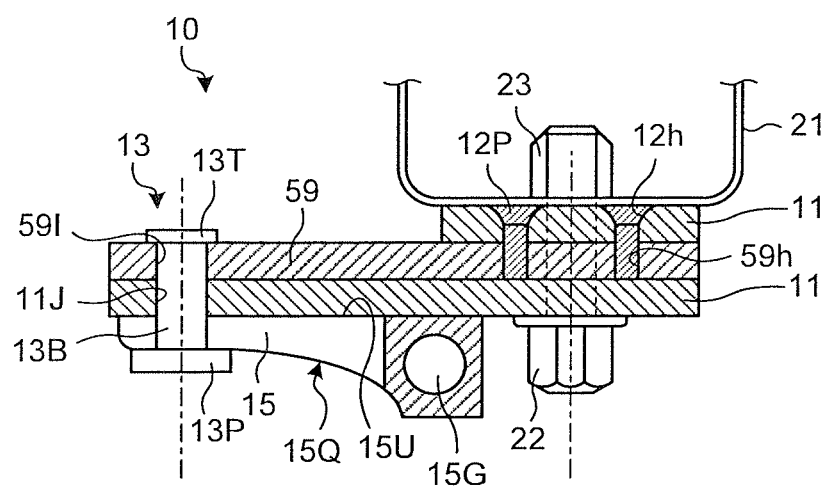
FIG. 5 is a schematic cross-sectional view illustrating a state before the supporting apparatus for the steering bracket according to the first embodiment is separated.

FIG. 1 is a constitution diagram an electric power steering apparatus provided with an electric motor according to a first embodiment. FIG. 2 is a side view schematically illustrating a periphery of a steering column. FIG. 3 is a plan view schematically illustrating a supporting apparatus for a steering bracket that is used to attach a steering column to a vehicle. FIG. 4 is a perspective view schematically illustrating a portion in which the steering column is attached to the vehicle. FIG. 5 is a schematic cross-sectional view illustrating a state before the supporting apparatus for the steering bracket according to the first embodiment is separated. FIG. 5 is a cross-sectional view taken along the line A-A direction of FIG. 3. The outline of an electric power steering apparatus 80 will be described with reference to FIGS. 1 to 5. In the following description, a front of the vehicle when the electric power steering apparatus 80 is attached to the vehicle is simply described as a front and a rear of the vehicle when the electric power steering apparatus 80 is attached to the vehicle is simply described as a rear.

<Electric Power Steering Apparatus>

In the order in which a force is transmitted by a driver (operator), the electric power steering apparatus 80 includes a steering wheel 81, a steering shaft 82, a steering force assisting mechanism 83, an universal joint 84, a lower shaft 85, an universal joint 86, a pinion shaft 87, a steering gear 88, and a tie rod 89. In addition, the electric power steering apparatus 80 includes an ECU (Electronic Control Unit) 90 and a torque sensor 91a. A vehicle speed sensor 91b is provided in the vehicle and inputs a vehicle speed signal V to the ECU 90 using a CAN (Controller Area Network) communication.

The steering shaft 82 includes an input shaft 82a and an output shaft 82b. One end of the input shaft 82a is connected to the steering wheel 81 and the other end thereof is connected to the steering force assisting mechanism 83 through the torque sensor 91a. One end of the output shaft 82b is connected to the steering force assisting mechanism 83 and the other end thereof is connected to the universal joint 84. In this embodiment, the input shaft 82a and the output shaft 82b are formed of a magnetic material such as iron.

One end of the lower shaft 85 is connected to the universal joint 84 and the other end thereof is connected to the universal joint 86. One end of the pinion shaft 87 is connected to the universal joint 86 and the other end thereof is connected to the steering gear 88.

The steering gear 88 includes a pinion 88a and a rack 88b. The pinion 88a is connected to the pinion shaft 87. The rack 88b is engaged with the pinion 88a. The steering gear 88 is constituted as a rack-and-pinion type. The steering gear 88 converts a rotational motion transmitted to the pinion 88a into a linear motion with the rack 88b. The tie rod 89 is connected to the rack 88b.

The steering force assisting mechanism 83 includes a reduction gear 92 and an electric motor (motor) 70. Further, the electric motor 70 is a so-called brushless motor which is described as an example, but the electric motor 70 may be an electric motor provided with a brush (slider) and a commutator. The reduction gear 92 is connected to the output shaft 82b. The electric motor 70 is an electric motor connected to the reduction gear 92 and for generating auxiliary steering torque. In the electric power steering apparatus 80, the steering shaft 82, the torque sensor 91a, and the reduction gear 92 form a steering column. The electric motor configured 70 provides the auxiliary steering torque to the output shaft 82b of the steering column. That is, the electric power steering apparatus 80 according to this embodiment is a column assist system.

As illustrated in FIG. 2, the steering force assisting mechanism 83 of the electric power steering apparatus 80 includes a steering column 50 and a steering bracket 52, referred to as an upper attachment bracket functions, as a mechanism for supporting each parts such as the ECU 90 and the electric motor 70. The steering column 50 rotatably supports the input shaft 82a. The steering column 50 has a double tube structure constituted by an outer column 51 and an inner column 54 which absorb impact energy at the time of collapse and secure a predetermined collapse contract at a coupling portion to the reduction gear 92.

The steering bracket 52 is disposed on an upper side of the outer column 51 in a vertical direction. The steering bracket 52 is attached to a vehicle body and supports the outer column 51. The steering bracket 52 includes an attachment plate portion 52b, a frame-shaped support portion 52a formed integrally with the attachment plate portion 52b, and a tilt mechanism constituted to support the outer column 51. The attachment plate portion 52b of the steering bracket 52 is provided with a capsule support portion 59 extending to the outside from the outer column 51. The tilt mechanism is formed in the frame-shaped support portion 52a. The steering bracket 52 is fixed to a steering bracket supporting apparatus 10 (hereinafter, referred to as a supporting apparatus 10) so that the steering bracket 52 is supported by a vehicle body-side member 21 illustrated in FIG. 5.

The supporting state is released by an operation of rotating a tilt lever 53 of the tilt mechanism. By this operation, it is possible to adjust a tilt position of the steering column 50 upward and downward.

The torque sensor 91a illustrated in FIG. 1 detects a steering force by the driver, transmitted to the input shaft 82a through the steering wheel 81, as steering torque. The vehicle speed sensor 91b detects a running speed (vehicle speed) of the vehicle on which the electric power steering apparatus 80 is mounted. The ECU 90 is electrically connected to the electric motor 70, the torque sensor 91a, and the vehicle speed sensor 91b.

<Control Unit: ECU>

The ECU 90 controls the operation of the electric motor 70. In addition, the ECU 90 acquires a signal from each of the torque sensor 91a and the vehicle speed sensor 91b. In other words, the ECU 90 acquires steering torque T from the torque sensor 91a, and acquires a vehicle speed signal V of the vehicle from the vehicle speed sensor 91b. Power is supplied to the ECU 90 from a power supply unit (for example, buttery on the vehicle) 99 when an ignition switch 98 is turned ON. The ECU 90 calculates an auxiliary steering command value for an assist command, based on the steering torque T and the vehicle speed signal V. Then, the ECU 90 adjusts a power value X to be supplied to the electric motor 70 based on the calculated auxiliary steering command value. From the electric motor 70, the ECU 90 acquires information of an inductive voltage or rotation information of a rotor such as a resolver to be described below, as operation information Y.

The steering force by a steerer (driver) input to the steering wheel 81 is transmitted to the reduction gear 92 in the steering force assisting mechanism 83 through the input shaft 82a. At this time, the ECU 90 acquires the steering torque T, which is input to the input shaft 82a, from the torque sensor 91a and acquires the vehicle speed signal V from the vehicle speed sensor 91b. Then, the ECU 90 controls the operation of the electric motor 70. The auxiliary steering torque generated by the electric motor 70 is transmitted to the reduction gear 92.

The steering torque (including the auxiliary steering torque) output through the output shaft 82b is transmitted to the lower shaft 85 through the universal joint 84 and is further transmitted to the pinion shaft 87 through the universal joint 86. The steering force transmitted to the pinion shaft 87 is transmitted to the tie rod 89 through the steering gear 88, thereby causing the steering wheel to turn.

(Supporting Apparatus)

A separation capsule 11 illustrated in FIGS. 3 to 5 is formed by aluminum die-casting. The separation capsule 11 is provided with a capsule attachment hole 11h (see FIGS. 3 and 4) constituted to fix the separation capsule 11 to the vehicle body-side member 21 with a bolt 22 and a nut 23 illustrated in FIG. 5. In addition, the separation capsule 11 has three resin injection holes 12h (first capsule-side hole) communicated with resin injection holes 59h (first bracket-side hole) provided at a capsule support portion 59 of the steering bracket 52, and a resin member 12P straddles the resin injection hole 59h and the resin injection hole 12h in a state before the separation.

The resin member 12P is a mechanical fuse constituted to be fractured during a secondary collision by shearing force applied to the resin member 12P which is injected into the resin injection hole 12h of the separation capsule 11. A separation load causing the fracture of the resin member 12P depends on the material and the sheared cross-sectional area of the resin member 12P. Even when some of the resin member 12P is cut and thus the set value of the separation load, at which the steering column moves in the front of the vehicle, is lowered, a shear pin 13 according to the first embodiment straddles a second bracket-side hole 59I and a second capsule-side hole 11J in the state before the separation so as to withstand impact of, for example, an telescopic operation in an ordinary use. The ordinary use includes a condition where inertial or impact is applied due to acceleration and deceleration during a driving operation.

In the ordinary use, when a load is applied to the steering column, which is attached to the vehicle, by the impact of, for example, telescopic operation, if the steering column is pushed to the front of the vehicle, the resin member 12P is subjected to the shearing force and the shearing force is similarly applied to the shear pin 13. Thus, the fracture of the resin member 12P is suppressed and the malfunction is suppressed during the ordinary use.

The shear pin 13 may be made of the same resin as the resin member 12P or be made of a metal. When the shear pin 13 is formed of the resin, the shear pin 13 is fractured simultaneously with the resin member 12P and thus the steering bracket 52 can be separated from the separation capsule 11 fixed to the vehicle body-side member 21 when a considerable load, which an operation of an inertial action body to be described below does not catch up with, is applied in a short time.

As illustrated in FIG. 5, the shear pin 13 includes a cylindrical shear pin body 13B, a head portion 13P which is provided at one end of the shear pin body 13B and has a diameter larger than that of the shear pin body 13B, and a hook portion 13T which is provided at the other end of the shear pin body 13B and is positioned at an edge of the second bracket-side hole 59I of the capsule support portion 59. The hook portion 13T, having the diameter larger than that of the shear pin body 13B and a thickness smaller than that of the head portion 13P, has a fragile structure.

Figure 6:
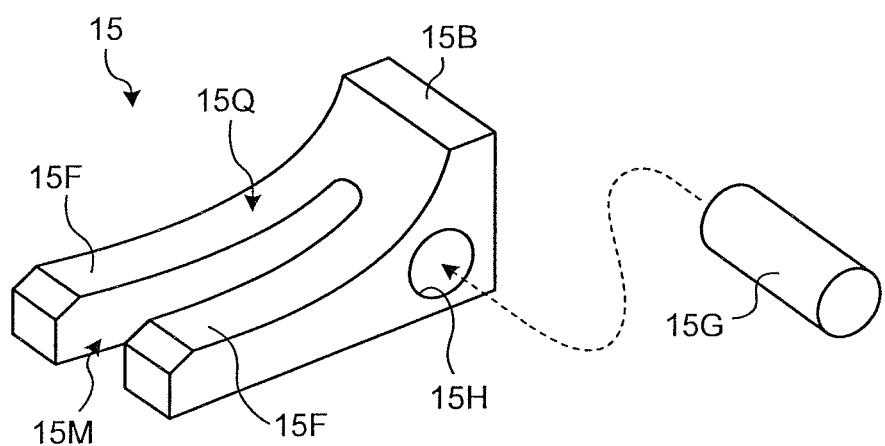
FIG. 6 is a perspective view schematically illustrating an inertial action body according to the first embodiment.

An inertial action body 15 is clamped and fixed between the head portion 13P of the shear pin 13 and the surface of the separation capsule 11. FIG. 6 is a perspective view schematically illustrating the inertial action body according to the first embodiment. As illustrated in FIGS. 5 and 6, the inertial action body 15 has a shape like a head of a nail puller. The inertial action body 15 includes a base portion 15B and two-pronged claw portions 15F and 15F obtained by dividing a part of the base portion 15B with a slit 15M. The claw portions 15F and 15F have an inclined surface or a curved surface such that the distance from the surface of the separation capsule 11 increases toward the base portion 15B. Thus, the inertial action body 15 can convert the inertial action applied thereto to an action to pull out the shear pin 13 from the second bracket-side hole 59I. The shear pin 13 penetrates into the slit 15M, and the head portion 13P comes in contact with a surface 15Q of the claw portion 15F. As a result, as described above, the inertial action body 15 is clamped between the head portion 13P of the shear pin 13 and the surface of the separation capsule 11, and a sliding contact surface 15U of inertial action body 15 is firmly adhered to the separation capsule 11. Therefore, frictional force is generated between the sliding contact surface 15U of the inertial action body 15 and the separation capsule 11, so that the movement of the inertial action body 15 is set to be suppressed for a relatively weak impact.

As illustrated in FIG. 6, in the inertial action body 15, a weight portion 15G is inserted into a hole 15H such that the center of gravity of the inertial action body 15 gathers to the base portion 15B. Thus, it is possible to set a set value of an operation load in which the inertial action body 15 operates. In the first embodiment, the inertial action body 15 is provided with the weight portion 15G separately from the base portion 15B, but may be a weight portion in which the center of gravity of the inertial action body 15 gathers due to the material, the shape, and the like of the base portion 15B. The weight portion 15G biases the center of gravity of the inertial action body 15 toward the base portion 15B.

As illustrated in FIG. 6, in the inertial action body 15, the base portion 15B and the claw portions 15F are made of an iron material such as stainless steel and the weight portion 15G is made of a material such as tungsten carbide having a larger specific gravity than the base portion 15B.

Figure 7:
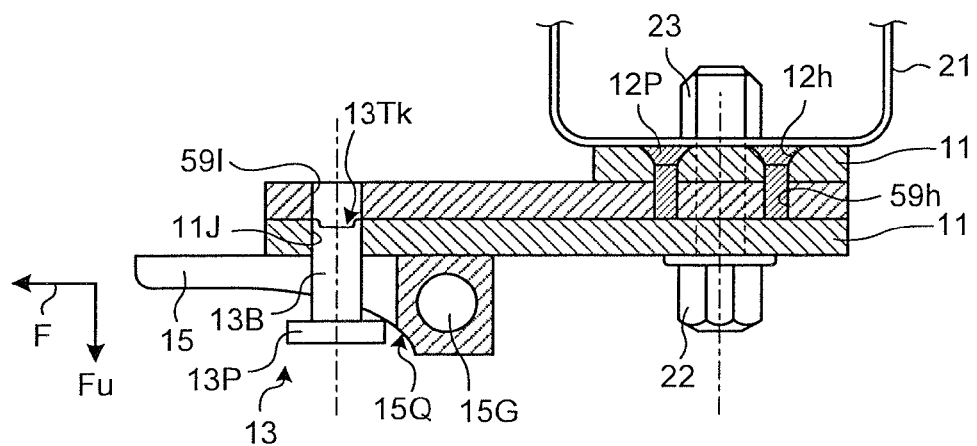
FIG. 7 is a schematic cross-sectional view illustrating a state where the shear pin is pulled out in the supporting apparatus for the steering bracket according to the first embodiment.

FIG. 7 is a schematic cross-sectional view illustrating a state where the shear pin is pulled out in the supporting apparatus for the steering bracket according to the first embodiment. For example, when an impact such as a primary collision of the vehicle, which exceeds the set value of the operation load in which the inertial action body 15 operates, is applied to the supporting apparatus 10, the inertial action body 15 moves in a direction F toward the front of the vehicle. The head portion 13P of the shear pin 13 moves along the surface 15Q and the hook portion 13T illustrated in FIG. 5 is broken. Alternatively, the hook portion 13T is deformed to become an end 13Tk to be drawn into the second bracket-side hole 59I and the second capsule-side hole 11J, and is pulled out from the second bracket-side hole 59I as the inertial action body 15 moves. As a result, the shear pin body 13B of the shear pin 13 drops or is pulled out from the second bracket-side hole 59I in a direction Fu as the inertial action body 15 moves. Thus, the weight portion 15G moves to the front of the vehicle by the inertia due to the primary collision, and thus the shear pin 13 can be pulled out from the second bracket-side hole 59I with the movement of the weight portion 15.

Figure 8:
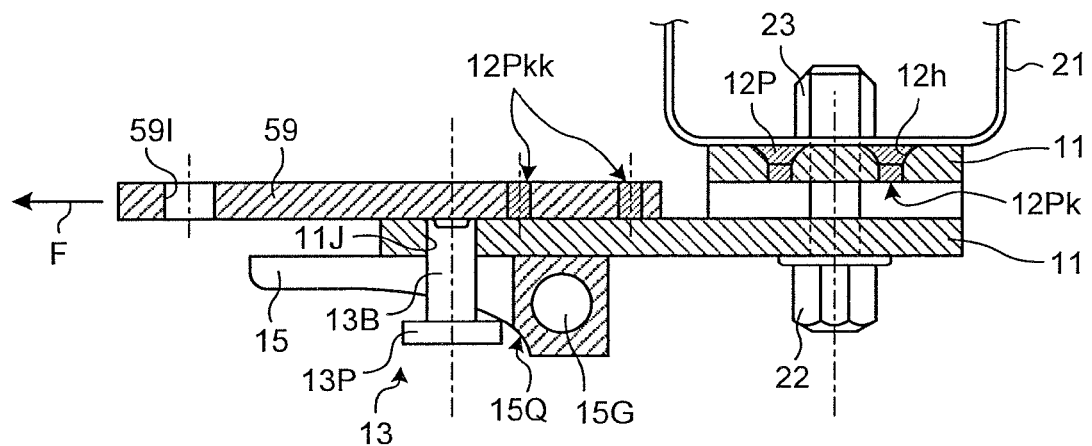
FIG. 8 is a schematic cross-sectional view illustrating a state after the supporting apparatus for the steering bracket according to the first embodiment is separated.

FIG. 8 is a schematic cross-sectional view illustrating a state after the supporting apparatus for the steering bracket according to the first embodiment is separated. Subsequently, when an excessive load which exceeds a load set value of the secondary collision is applied to the steering column 50 attached to the vehicle, and the steering column 50 is pushed in the direction F toward the front of the vehicle, a part of the resin member 12P is cut into a resin piece 12Pk and a resin piece 12Pkk. Therefore, the steering column 50 moves to the front of the vehicle to separate the capsule support portion 59 from the separation capsule 11, and the supporting apparatus 10 protects the driver (operator) from a thrust (secondary collision) of a steering wheel.

As described above, the supporting apparatus 10 includes the capsule support portion 59 of the steering bracket 52 supporting the steering column 50, and the separation capsule 11 to fix the vehicle body-side member 21 and the steering bracket 52. The capsule support portion 59 includes the first capsule-side hole 12h and the second capsule-side hole 11J opened thereon, and the separation capsule 11 includes the first bracket-side hole 59h and the second bracket-side hole 59I opened thereon. The resin member 12P is arranged at a position straddling the first bracket-side hole 59h and the first capsule-side hole 12h before the separation. The shear pin 13 is arranged at a position straddling the second bracket-side hole 59I and the second capsule-side hole 11J before the separation. The inertial action body 15 moves separately from the steering column by the action of inertia applied independently to the inertial action body 15 and the shear pin 13 can be pulled out from the second bracket-side hole 59I with the movement of the inertial action body 15.

For this reason, when the load is applied to the steering column 50, which is attached to the vehicle, by the impact in the ordinary use, if the steering column 50 is pushed in the direction F toward the front of the vehicle, the resin member 12P is subjected to the shearing force and the shearing force is similarly applied to the shear pin 13. Thus, the fracture of the resin member 12P is suppressed and the malfunction is suppressed during the ordinary use.

When the excessive load which exceeds the load set value of the secondary collision is applied to the steering column attached to the vehicle and the steering column 50 is pushed in the Direction F toward the front of the vehicle, the inertial action body 15 moves and the shear pin 13 is pulled out from the second bracket-side hole 59I with the movement of the inertial action body 15. Thereafter, some of the resin member 12P is cut into the resin piece 12Pk and the resin piece 12Pkk, the steering column thus moves to the front of the vehicle to make the state where the capsule support portion 59 is separated from the separation capsule 11, and the supporting apparatus 10 alleviates the impact caused by the collision (secondary collision) of the driver (operator) with the steering wheel. As a result, a part of the supporting structure is cut, which causes lowering of the set value of the separation load at which the steering column 50 moves in the Direction F toward the front of the vehicle, therefore the supporting apparatus 10 can further protect an operator who is light in weight.

The inertial action body 15 according to the first embodiment is fixed to the separation capsule 11 side, but may be fixed to the capsule support portion 59 side. The electric power steering apparatus 80 (steering apparatus) is supported by the supporting apparatus 10 described above. Thus, a part of the supporting structure is cut, which causes lowering of the set value of the separation load at which the steering column 50 moves to the front of the vehicle, therefore the steering apparatus can further protect the operator who is light in weight.

Second Embodiment

Figure 9:
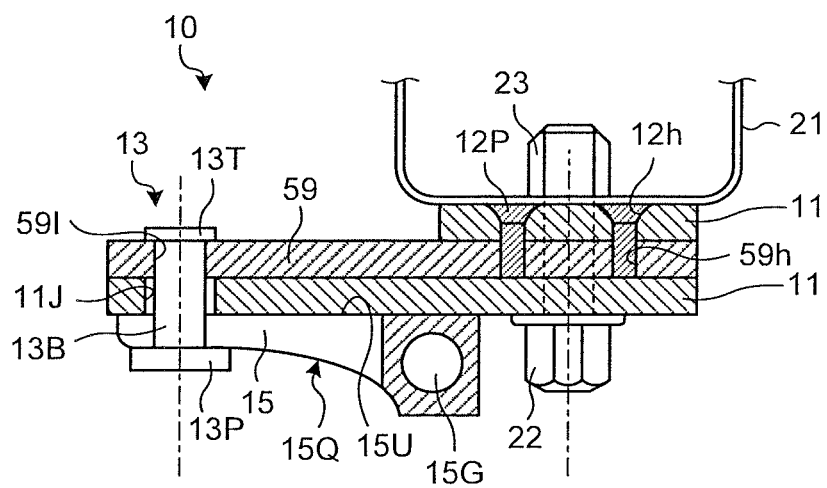
FIG. 9 is a schematic cross-sectional view illustrating a state before a supporting apparatus for a steering bracket according to a second embodiment is separated.
Figure 10:
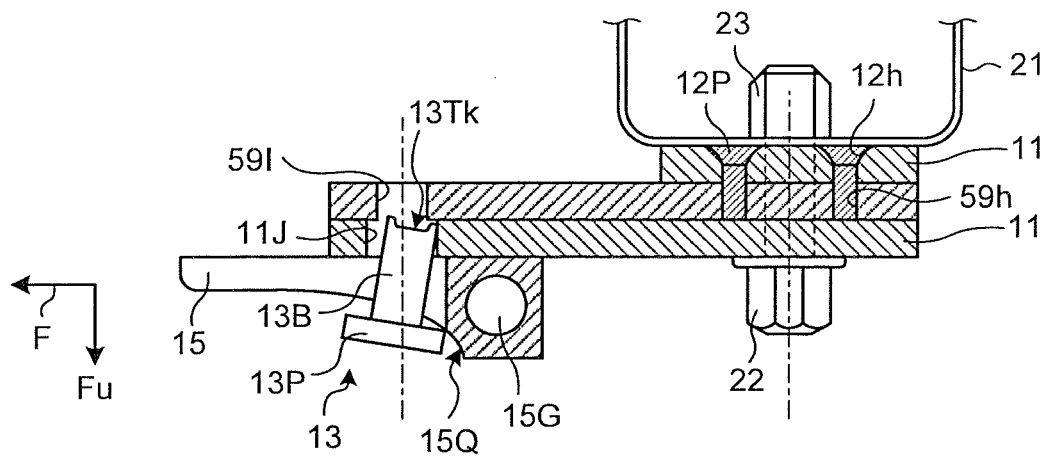
FIG. 10 is a schematic cross-sectional view illustrating a state where a shear pin of the supporting apparatus for the steering bracket according to the second embodiment is pulled out.

FIG. 9 is a schematic cross-sectional view illustrating a state before a supporting apparatus for a steering bracket according to a second embodiment is separated. FIG. 10 is a schematic cross-sectional view illustrating a state a shear pin of the supporting apparatus for the steering bracket according to the second embodiment is pulled out. The same members as those described above are denoted by the same reference numerals and the description thereof will not be presented to avoid duplication. As illustrated in FIGS. 9 and 10, with respect to a second bracket-side hole 59I and a second capsule-side hole 11J, one of the second bracket-side hole 59I and the second capsule-side hole 11J, which is located near the head portion 13P of the shear pin 13, has a larger diameter than the other. For example, the second capsule-side hole 11J has the larger diameter than the second bracket-side hole 59I. Thus, as illustrated in FIG. 9, the second capsule-side hole 11J holds the posture of the shear pin body 13B before the separation. For example, when impact such as a primary collision of the vehicle, which exceeds a set value of an operation load in which an inertial action body 15 operates, is applied to the supporting apparatus 10, the inertial action body 15 moves in a direction F toward a front of a vehicle. The head portion 13P of the shear pin 13 moves along a surface 15Q and a hook portion 13T illustrated in FIG. 9 is broken. Alternatively, the shear pin 13 is deformed to have an end 13Tk, thereby being drawn into the second bracket-side hole 59I and the second capsule-side hole 11J and being pulled out from the second bracket-side hole 59I as the inertial action body 15 moves. As a result, the shear pin body 13B of the shear pin 13 drops or is pulled out from the second bracket-side hole 59I in a direction Fu as the inertial action body 15 moves. In this case, as illustrated in FIG. 10, with respect to the relation between the surface 15Q and the head portion 13P, when the surface 15Q has an inclined surface or a curved surface, the head portion is not necessarily pulled out parallel to the direction Fu. As in the second embodiment, when the second capsule-side hole 11J has a larger diameter than the second bracket-side hole 59I, it is possible to increase the probability of the pulling-out even when the posture of the shear pin body 13B is inclined.

Third Embodiment

Figure 11:
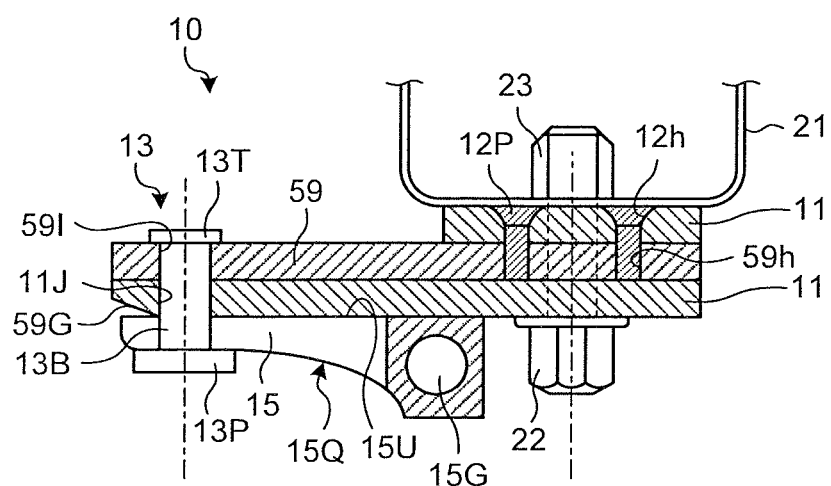
FIG. 11 is a schematic cross-sectional view illustrating a state before a supporting apparatus for a steering bracket according to a third embodiment is separated.

FIG. 11 is a schematic cross-sectional view illustrating a state before a supporting apparatus for a steering bracket according to a third embodiment is separated. The same members as those described above are denoted by the same reference numerals and the description thereof will not be presented to avoid duplication. As illustrated in FIG. 11, a guide surface 59G is provided on the surface of a capsule support portion 59 or a separation capsule 11 of a steering bracket to guide a movement direction of an inertial action body 15 due to action of inertia. For example, even when a moment load including a rotational component is applied to a weight portion 15G, a shear pin 13 can be pulled out along the guide surface 59G by the inertial action body 15.

Fourth Embodiment

Figure 12:
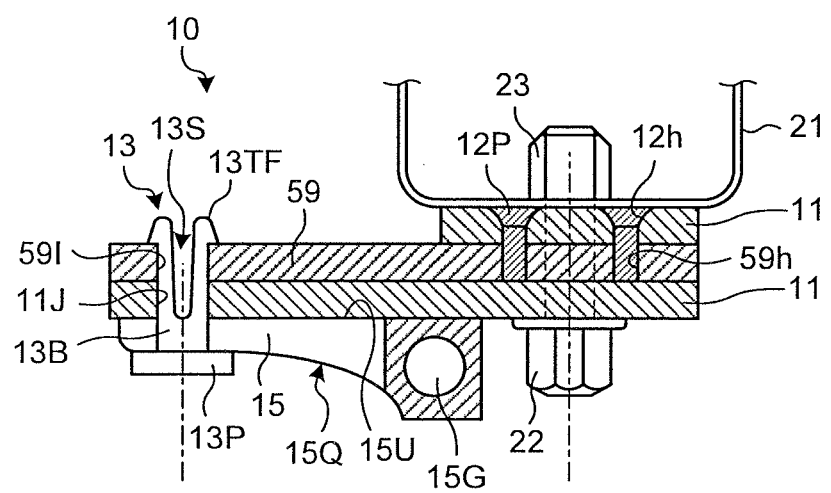
FIG. 12 is a schematic cross-sectional view illustrating a state before a supporting apparatus for a steering bracket according to a fourth embodiment is separated.

FIG. 12 is a schematic cross-sectional view illustrating a state before a supporting apparatus for a steering bracket according to a fourth embodiment is separated. The same members as those described above are denoted by the same reference numerals and the description thereof will not be presented to avoid duplication. As illustrated in FIG. 12, a shear pin 13 according to the fourth embodiment includes a cylindrical shear pin body 13B, a head portion 13P which is provided at one end of the shear pin body 13B and has a diameter larger than that of the shear pin body 13B, and a hook portion 13TF which is provided at the other end of the shear pin body 13B and is positioned at an edge of a second bracket-side hole 59I of a capsule support portion 59. A hollow portion 13S with a bottom is opened in the shear pin body 13B and elastic force is urged to the outside of a hook portion 13TF. Therefore, the shear pin 13 according to the fourth embodiment is constituted such that the diameter of the hook portion 13TF facilely decreases and it is possible to pull out the shear pin 13 without breakage.

Fifth Embodiment

Figure 13:
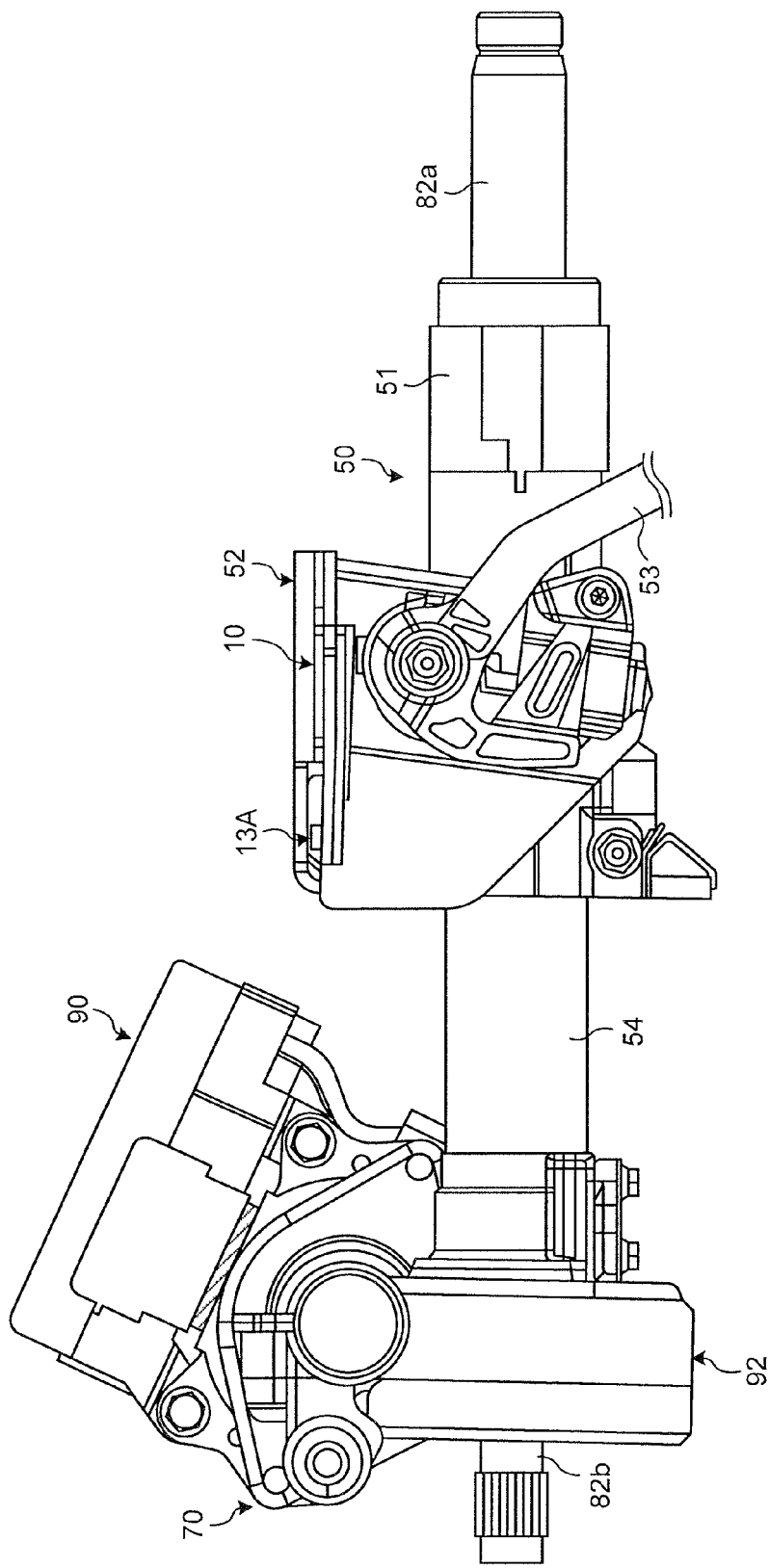
FIG. 13 is a plan view schematically illustrating a supporting apparatus for a steering bracket to attach a steering column to a vehicle.
Figure 14:
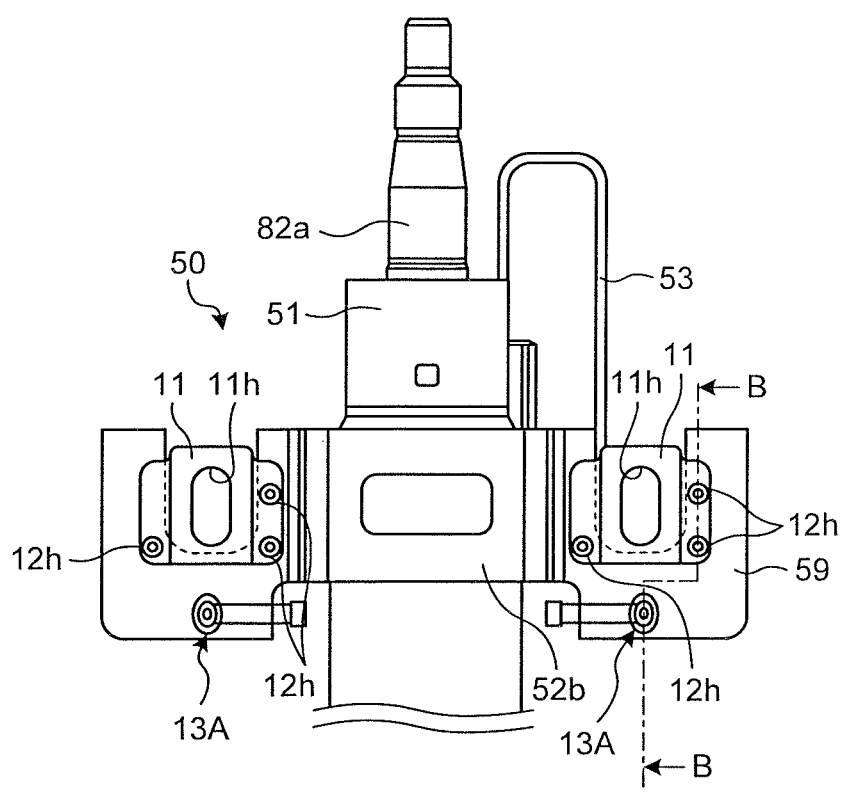
FIG. 14 is a perspective view schematically illustrating a portion where the steering column is attached to the vehicle.
Figure 15:
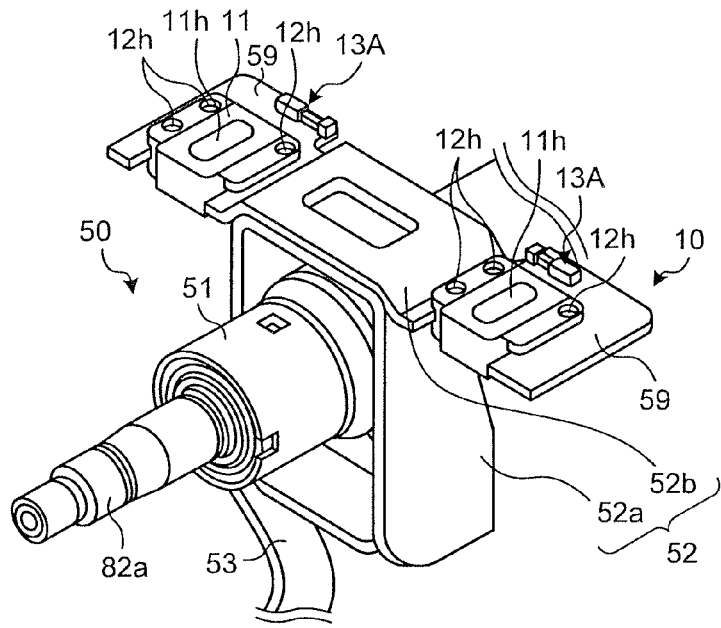
FIG. 15 is a perspective view schematically illustrating a portion where a steering column according to a fifth embodiment is attached to the vehicle.
Figure 16:
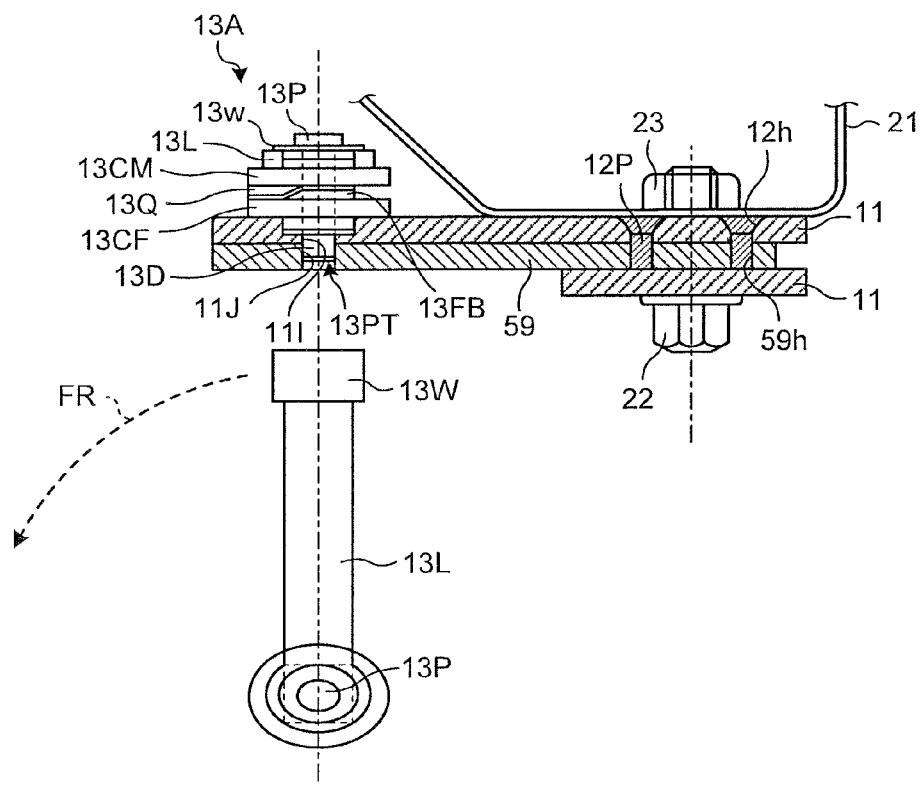
FIG. 16 is a schematic cross-sectional view illustrating a state before a supporting apparatus for a steering bracket according to the fifth embodiment is separated.

FIG. 13 is a plan view schematically illustrating a supporting apparatus for a steering bracket constituted to attach a steering column to a vehicle. FIG. 14 is a perspective view schematically illustrating a portion constituted to attach the steering column to the vehicle. FIG. 15 is a perspective view schematically illustrating a portion constituted to attach a steering column according to a fifth embodiment to the vehicle. FIG. 15 is a cross-sectional view as viewed in the line B-B direction of FIG. 13. FIG. 16 is a schematic cross-sectional view illustrating a state before a supporting apparatus for a steering bracket according to the fifth embodiment is separated. The same members as those described above are denoted by the same reference numerals and the description thereof will not be presented to avoid duplication. A separation capsule 11 illustrated in FIGS. 13 to 16 is formed by aluminum die-casting. The separation capsule 11 is provided with a capsule attachment hole 11h (see FIGS. 3 and 15) constituted to fix a separation capsule 11 to a vehicle body-side member 21 with a bolt 22 and a nut 23 illustrated in FIG. 16. In addition, the separation capsule 11 has three resin injection holes 12h (first capsule-side hole) communicated with resin injection holes 59h (first bracket-side hole) provided at a capsule support portion 59 of the steering bracket, and a resin member 12P straddles the resin injection hole 59h and the resin injection hole 12h in a state before the separation.

The resin member 12P injected into the resin injection hole 12h of the separation capsule 11 is a mechanical fuse constituted to be fractured by shearing force applied during a secondary collision. A separation load causing the fracture of the resin member 12P depends on the material and the sheared cross-sectional area of the resin member 12P. Even when a part of the resin member 12P is cut causing lowering of the set value of the separation load at which the steering column moves in the front of the vehicle, a shear pin 13D according to the fifth embodiment straddles a second bracket-side hole 11I and the second capsule-side hole 11J in the state before the separation so as to withstand impact of, for example, an telescopic operation in an ordinary use. The ordinary use includes a condition where inertial or impact is applied due to acceleration and deceleration during a driving operation.

When a load is applied to the steering column 50, which is attached to the vehicle, by the impact of, for example, telescopic operation in the ordinary use, if the steering column 50 is pushed to the front of the vehicle, the resin member 12P is subjected to the shearing force and the shearing force is similarly applied to the shear pin 13D. Thus, the fracture of the resin member 12P is suppressed and the malfunction is suppressed during the ordinary use.

The shear pin 13D may be made of the same resin as the resin member 12P and be made of a metal. When the shear pin 13D is formed of the resin, the shear pin 13D is fractured simultaneously with the resin member 12P and thus the steering bracket 52 can be separated from the separation capsule 11 fixed to the vehicle body-side member 21, when a considerable load is applied in a short time such that an operation of a cam mechanism to be described below does not catch up with the considerable load.

As illustrated in FIG. 16, the shear pin 13D includes a head portion 13P which is provided at one end of a shear pin body of solid cylindrical body and has a diameter larger than that of the shear pin body. A pin tip 13PT which is the other end of the shear pin body of the shear pin 13D is inserted into the second bracket-side hole 11I of the capsule support portion 59 in the state before the separation and is positioned in a cam mechanism 13A. The pin tip 13PT may be penetrated through the second bracket-side hole 11I.

Figure 17:
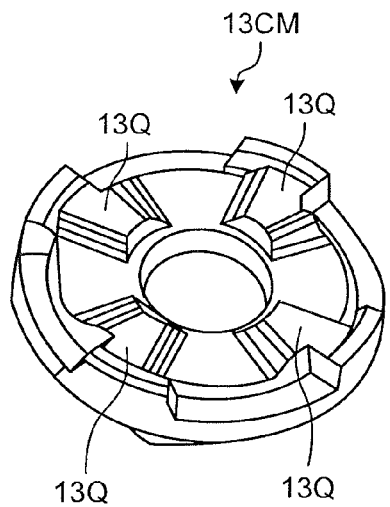
FIG. 17 is a perspective view schematically illustrating protrusion portions of a cam rotor of a cam mechanism according to the fifth embodiment.
Figure 18:
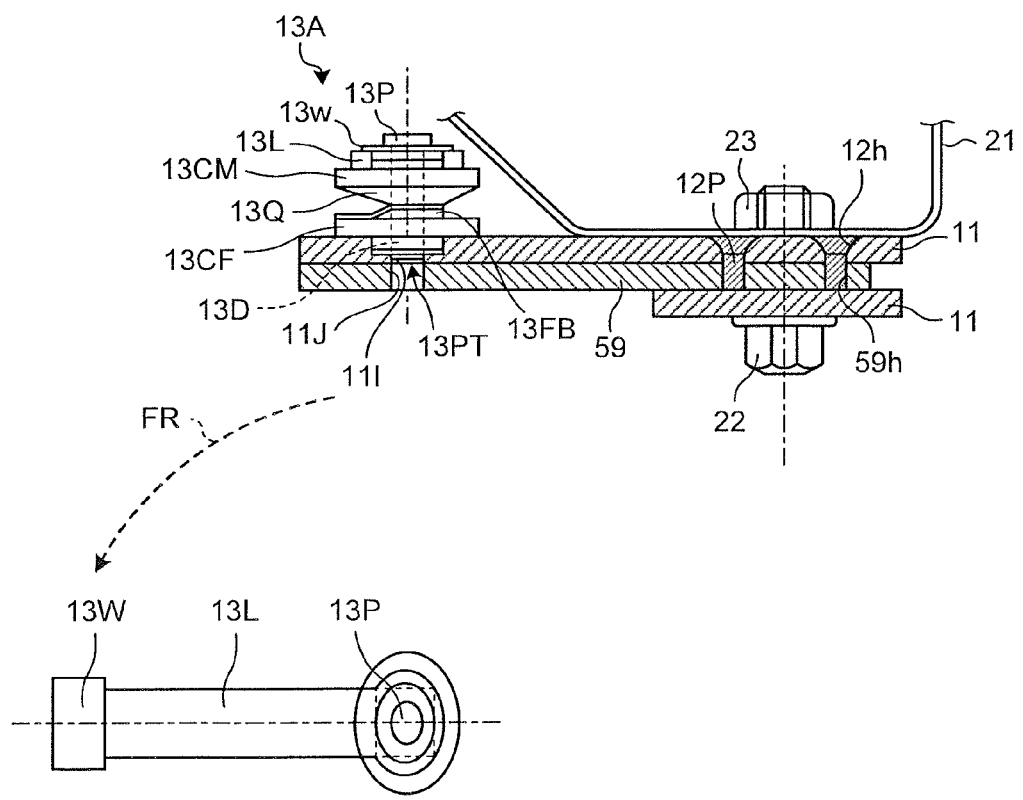
FIG. 18 is a schematic cross-sectional view illustrating a state a shear pin of the supporting apparatus for the steering bracket according to the fifth embodiment is pulled out.

The cam mechanism 13A includes a cam rotor 13CM interlocking with the shear pin 13D, and a cam stator 13CF fixed to the capsule support portion 59 or the separation capsule 11 of the steering bracket. FIG. 17 is a perspective view schematically illustrating protrusion portions of the cam rotor of the cam mechanism according to the fifth embodiment. As illustrated in FIG. 17, the cam rotor 13CM has protrusion portions 13Q on a surface facing the cam stator 13CF. The cam stator 13CF has protrusion portions 13FB, which are similar to the protrusion portions 13Q illustrated in FIG. 17, on a surface facing the cam rotor 13CM. Since the protrusion portions 13FB of the cam stator 13CF are located at recessed portions between the protrusion portions 13Q of the cam rotor 13CM, and the protrusion portions 13Q and the protrusion portions 13FB have the similar height, the protrusion portions 13Q and the protrusion portions 13FB are engaged with each other. When the cam rotor 13CM rotates relative to the cam stator 13CF, as illustrated in FIG. 18, the phase of the protrusion portions 13Q coincides with that of the protrusion portions 13FB. In this case, since the protrusion portions 13Q ride over the protrusion portions 13FB, the distance between the cam rotor 13CM and the cam stator 13CF increases. The shear pin 13D penetrates a lever member 13L to be described below and a washer 13w, and the head portion 13P is supported by the washer 13w. For this reason, the distance between the cam rotor 13CM and the cam stator 13CF increases depending on the rotation amount of the cam rotor 13CM which rotates relative to the cam stator 13CF. An insertion length of the shear pin 13D to be inserted into the second bracket-side hole 11I varies depending on the distance between the cam rotor 13CM and the cam stator 13CF. Thus, the cam mechanism 13A can convert the rotation motion, which depends on the amount of rotation due to the inertial action, to a motion in which the shear pin 13D is pulled out from the second bracket-side hole 11I.

The lever member 13L is a rod-shaped member which rotates interlocking with the rotation of the cam rotor 13CM. Since the lever member 13L applies the load to a part of the cam rotor 13CM, the lever member 13L is a member which is used to move the center of gravity of the cam rotor toward the outside from a rotation center of the cam rotor 13CM. Thus, it is possible to set a set value of an operation load in which the cam mechanism 13A operates. The lever member 13L is provided with a weight portion 13W at a side far from the cam rotor 13CM. The weight portion 13W is made of a material such as tungsten carbide having a larger specific gravity than the cam rotor 13CM. This makes it possible to increase the amount of movement of the center of gravity toward the outside from the rotation center of the cam rotor 13CM. In this way, the weight portion 13W allows the center of gravity of the lever member 13L to be biased toward the outside from the rotation center of the cam rotor 13CM.

As illustrated in FIG. 16, the lever member 13L is disposed in a direction orthogonal to the front of the vehicle when the surface of the separation capsule 11 is viewed in a plan view. For example, when impact such as a primary collision of the vehicle, which exceeds the set value of the operation load in which the lever member 13L rotates, is applied to the supporting apparatus 10, the lever member 13L of the cam mechanism 13A rotates in a direction FR toward the front of the vehicle. The distance between the cam rotor 13CM and the cam stator 13CF increases depending on the rotation amount of the cam rotor 13CM which rotates relative to the cam stator 13CF. The insertion amount of the shear pin 13D to be inserted into the second bracket-side hole 11I decreases with the movement of the cam rotor 13CM. As a result, as illustrated in FIG. 18, the shear pin 13D is pulled out from the second bracket-side hole 11I with the movement of the cam rotor 13CM.

Figure 19:
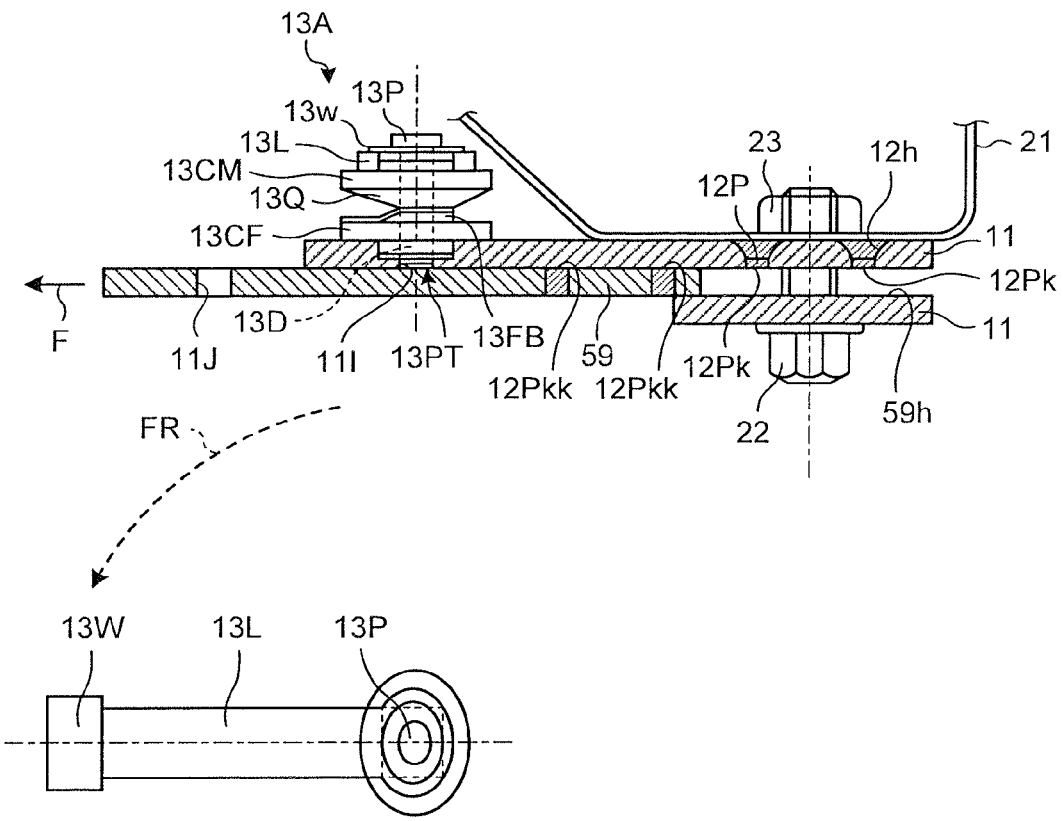
FIG. 19 is a schematic cross-sectional view illustrating a state after the supporting apparatus for the steering bracket according to the fifth embodiment is separated.

FIG. 19 is a schematic cross-sectional view illustrating a state after the supporting apparatus for the steering bracket according to the fifth embodiment is separated. Subsequently, when an excessive load exceeding a load set value of the secondary collision is applied to the steering column attached to the vehicle and the steering column is pushed to the front of the vehicle, a part of the resin member 12P is cut into a resin piece 12Pk and a resin piece 12Pkk, the steering column moves to the front of the vehicle to make the state where the capsule support portion 59 is separated from the separation capsule 11, and the supporting apparatus 10 alleviates the impact caused by the collision (secondary collision) of the driver (operator) with the steering wheel.

As described above, the supporting apparatus 10 includes the capsule support portion 59 of the steering bracket 52, which supports the steering column 50, and the separation capsule 11 to fix the vehicle body-side member 21 and the steering bracket, and the capsule support portion 59 includes the first capsule-side hole 12h and the second capsule-side hole 11J opened thereon, and the separation capsule 11 includes the first bracket-side hole 59h and the second bracket-side hole 11I opened thereon. The shear pin 13D is arranged at a position straddling the first bracket-side hole 59h and the first capsule-side hole 12h before the separation. The resin member 12P is arranged at a position straddling the second bracket-side hole 11I and the second capsule-side hole 11J before the separation. In the supporting apparatus 10, the cam mechanism 13A rotates by the action of inertia. That is, the weight portion 13W rotates around the shear pin 13D by the inertia due to the primary collision and moves to the front of the vehicle. The shear pin 13D can be pulled out from the second bracket-side hole 11I with the rotation of the cam mechanism 13A.

For this reason, when the load due to the impact during the ordinary use is applied to the steering column 50 attached to the vehicle, if the steering column 50 is pushed to the front of the vehicle, the resin member 12P is subjected to the shearing force, and the shearing force is similarly applied to the shear pin 13D. Thus, the fracture of the resin member 12P is suppressed and the malfunction is suppressed during the ordinary use.

When the excessive load exceeding the load set value of the secondary collision is applied to the steering column attached to the vehicle and the steering column 50 is pushed in the direction F toward the front of the vehicle, since the cam mechanism 13A rotates by the action of inertia and the shear pin 13D is pulled out from the second bracket-side hole 11I with the rotation of the cam mechanism 13A, a part of the resin member 12P is cut into the resin piece 12Pk and the resin piece 12Pkk, the steering column thus moves to the front of the vehicle to make the state where the capsule support portion 59 is separated from the separation capsule 11, and the supporting apparatus 10 alleviates the impact caused by the collision (secondary collision) of the driver (operator) with the steering wheel. As a result, a part of the supporting structure is cut, which lowers the set value of the separation load at which the steering column 50 moves in the direction F toward the front of the vehicle, so that the supporting apparatus 10 can further protect an operator who is light in weight.

The cam mechanism 13A according to the fifth embodiment is fixed to the surface of the capsule support portion 59, but may be fixed to the separation capsule 11 side. An electric power steering apparatus 80 (steering apparatus) is supported by the supporting apparatus 10 described above. Thus, a part of the supporting structure is cut, which lowers the set value of the separation load at which the steering column 50 moves to the front of the vehicle, so that the steering apparatus can further protect the operator who is light in weight.

Sixth Embodiment

Figure 20:
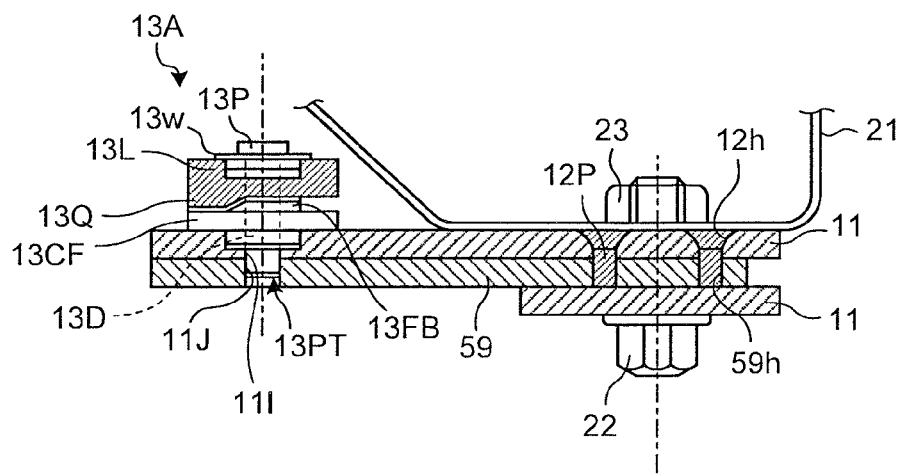
FIG. 20 is a schematic cross-sectional view illustrating a state before a supporting apparatus for a steering bracket according to a sixth embodiment is separated.

FIG. 20 is a schematic cross-sectional view illustrating a state before a supporting apparatus for a steering bracket according to a sixth embodiment is separated. The same members as those described above are denoted by the same reference numerals and the description thereof will not be presented to avoid duplication. As illustrated in FIG. 20, the function of the cam rotor 13CM according to the fifth embodiment may be integrated with a lever member 13L. The lever member 13L is provided with protrusion portions 13Q. The lever member 13L may be integrated with or fixed to a head portion 13P of a shear pin 13D.

Seventh Embodiment

Figure 21:
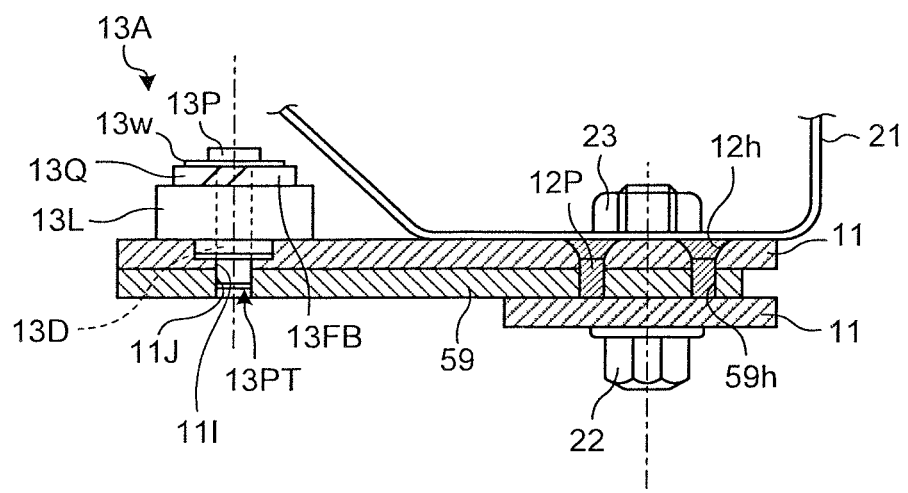
FIG. 21 is a schematic cross-sectional view illustrating a state before a supporting apparatus for a steering bracket according to a seventh embodiment is separated.
Figure 22:
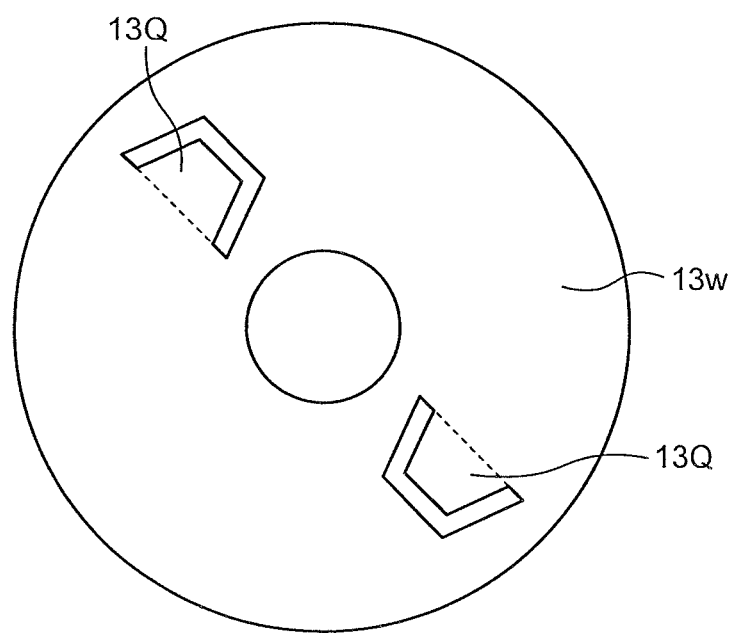
FIG. 22 is a schematic diagram of a washer of the supporting apparatus for the steering bracket according to the seventh embodiment.

FIG. 21 is a schematic cross-sectional view illustrating a state before a supporting apparatus for a steering bracket according to a seventh embodiment is separated. FIG. 22 is a schematic diagram of a washer of the supporting apparatus for the steering bracket according to the seventh embodiment. The same members as those described above are denoted by the same reference numerals and the description thereof will not be presented to avoid duplication. As illustrated in FIG. 21, the function of the cam rotor 13CM according to the fifth embodiment may be integrated with a washer 13w. As illustrated in FIG. 22, the washer 13w is provided with protrusion portions 13Q which are bendable by a slit. The protrusion portions 13Q are cut and raised, and thus the washer 13w protrudes toward a protrusion portion 13FB of the lever member 13L.

REFERENCE SIGNS LIST

10 SUPPORTING APPARATUS
11 SEPARATION CAPSULE
11h CAPSULE ATTACHMENT HOLE
11J SECOND CAPSULE-SIDE HOLE
12h RESIN INJECTION HOLE (FIRST CAPSULE-SIDE HOLE)
12P RESIN MEMBER
12Pk, 12Pkk RESIN PIECE
13, 13D SHEAR PIN
13A CAM MECHANISM
13B SHEAR PIN BODY
13CF CAM STATOR
13CM CAM ROTOR
13FB PROTRUSION PORTIONS
13L LEVER MEMBER
13P HEAD PORTION
13PT PIN TIP
13Q PROTRUSION PORTIONS
13S HOLLOW PORTION
13T HOOK PORTION
13TF HOOK PORTION
13W WEIGHT PORTION
13w WASHER
15 INERTIAL ACTION BODY
15B BASE PORTION
15F CLAW PORTION
15G WEIGHT PORTION
15H HOLE
15M SLIT
15Q SURFACE
15U SLIDING CONTACT SURFACE
21 VEHICLE BODY-SIDE MEMBER
22 BOLT
23 NUT
50 STEERING COLUMN
51 OUTER COLUMN
52 STEERING BRACKET
53 TILT LEVER
54 INNER COLUMN
59 CAPSULE SUPPORT PORTION
59h RESIN INJECTION HOLE (FIRST BRACKET-SIDE HOLE)
59I, 11I SECOND BRACKET-SIDE HOLE
70 ELECTRIC MOTOR
80 ELECTRIC POWER STEERING APPARATUS
81 STEERING WHEEL
82 STEERING SHAFT
82a INPUT SHAFT
82b OUTPUT SHAFT
83 STEERING FORCE ASSISTING MECHANISM
84 UNIVERSAL JOINT
85 LOWER SHAFT
86 UNIVERSAL JOINT
87 PINION SHAFT
88 STEERING GEAR
88a PINION
88b RACK
89 TIE ROD
90 ECU
91a TORQUE SENSOR
91b VEHICLE SPEED SENSOR
92 REDUCTION GEAR
98 IGNITION SWITCH
99 POWER SUPPLY UNIT

The invention claimed is:

1. A supporting apparatus for a steering bracket, comprising:
a steering bracket supporting a steering column, the steering bracket including a first capsule-side hole and a second capsule-side hole opened thereon;
a separation capsule to fix a vehicle body-side member to the steering bracket, the separation capsule including a first bracket-side hole and a second bracket-side hole opened thereon;
a resin member arranged at a position straddling the first bracket-side hole and the first capsule-side hole in a state before separation;
a shear pin arranged at a position straddling the second bracket-side hole and the second capsule-side hole in a state before separation; and
a cam mechanism including a rotatable weight portion to pull out the shear pin from the second bracket-side hole, the weight portion constituted to rotate around the shear pin by inertia due to a primary collision and to move to a front of a vehicle, and the cam mechanism constituted to pull out the shear pin from the bracket-side hole by a rotation of the weight portion.

2. The supporting apparatus for the steering bracket according to claim 1, wherein the cam mechanism includes a cam rotor interlocking with the shear pin and a cam stator fixed to the steering bracket or the separation capsule,
> the cam rotor is constituted to rotate relative to the cam stator and to change an insertion length of the shear pin into the second bracket-side hole depending on the rotation amount of the cam rotor.

3. The supporting apparatus for the steering bracket according to claim 2, wherein the cam rotor includes a lever member to move a center of gravity outward from a rotation center of the cam rotor.

4. The supporting apparatus for the steering bracket according to claim 3, wherein the weight portion is located at a side far from the cam rotor of the lever member.

5. A steering apparatus that is supported by the supporting apparatus for the steering bracket according to claim 1.

* * * * *